US007861090B2

(12) United States Patent
Kimura

(10) Patent No.: US 7,861,090 B2
(45) Date of Patent: Dec. 28, 2010

(54) ELECTRIC CONFERENCE SYSTEM AND CONTROL METHOD THEREOF

(75) Inventor: Tadashi Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1090 days.

(21) Appl. No.: 10/861,383

(22) Filed: Jun. 7, 2004

(65) Prior Publication Data

US 2005/0044384 A1    Feb. 24, 2005

(30) Foreign Application Priority Data

Jul. 30, 2003   (JP) ............................. 2003-203935

(51) Int. Cl.
G06F 7/04    (2006.01)
G06F 17/30   (2006.01)
H04N 7/16    (2006.01)
H04L 9/32    (2006.01)
G06F 21/00   (2006.01)
B41K 3/38    (2006.01)
H04L 9/00    (2006.01)
H04L 12/16   (2006.01)

(52) U.S. Cl. ............................. 713/183; 726/2; 726/27; 713/168; 380/59; 380/277; 370/260

(58) Field of Classification Search .................. 713/183
See application file for complete search history.

(56) References Cited

U.S. PATENT DOCUMENTS

| | | | | |
|---|---|---|---|---|
| 5,694,544 | A | | 12/1997 | Tanigawa et al. ........ 395/200.04 |
| 5,712,658 | A | * | 1/1998 | Arita et al. ................... 345/158 |
| 5,717,856 | A | * | 2/1998 | Carleton et al. ............. 709/205 |
| 6,092,196 | A | * | 7/2000 | Reiche ........................... 726/6 |
| 6,148,404 | A | * | 11/2000 | Yatsukawa ....................... 726/2 |
| 6,343,313 | B1 | * | 1/2002 | Salesky et al. ............... 709/204 |
| 6,728,784 | B1 | * | 4/2004 | Mattaway .................... 709/245 |
| 6,742,116 | B1 | * | 5/2004 | Matsui et al. ................. 713/171 |
| 6,904,526 | B1 | * | 6/2005 | Hongwei ..................... 713/182 |
| 6,928,166 | B2 | | 8/2005 | Yoshizawa ................... 380/247 |
| 6,928,558 | B1 | * | 8/2005 | Allahwerdi et al. ............. 726/9 |
| 7,225,227 | B2 | | 5/2007 | Omura et al. ................ 709/205 |

(Continued)

FOREIGN PATENT DOCUMENTS

JP    4-260165    9/1992

(Continued)

OTHER PUBLICATIONS

Office Action From Counterpart Japanese Patent Application No. 2003-203935, dated Jan. 15, 2010. 2 pages.

*Primary Examiner*—Nasser Moazzami
*Assistant Examiner*—Oscar A Louie
(74) *Attorney, Agent, or Firm*—Fitzpatrick, Cella, Harper & Scinto

(57) ABSTRACT

In an electric conference system using a large-screen display, presentation in an environment with a plurality of portable terminals connected is not taken into consideration. To do this, a host computer for an electric conference system is arranged to store a member ID to specify a terminal, generate a password, display the generated password on a large-screen display and make the password open to participants of a conference, authenticate the terminal on the basis of a member ID and a password, which are contained in a connection request received from the terminal, and process a command received from the terminal on the basis of the authentication result.

7 Claims, 9 Drawing Sheets

U.S. PATENT DOCUMENTS

| | | | |
|---|---|---|---|
| 7,430,579 B2 | 9/2008 | Omura et al. | 709/205 |
| 2002/0016836 A1 | 2/2002 | Suzuki et al. | 709/223 |
| 2002/0026590 A1* | 2/2002 | Kusunoki | 713/201 |
| 2002/0154335 A1 | 10/2002 | Matoba et al. | 358/1.15 |
| 2003/0051139 A1* | 3/2003 | Kubota | 713/168 |
| 2003/0122923 A1* | 7/2003 | Shachar et al. | 348/14.08 |
| 2004/0109175 A1 | 6/2004 | Hatori et al. | 358/1.1 |
| 2004/0117194 A9* | 6/2004 | Lee et al. | 705/1 |
| 2005/0015604 A1* | 1/2005 | Sundararajan et al. | 713/184 |
| 2005/0044126 A1 | 2/2005 | Oogaki et al. | 709/204 |
| 2005/0132412 A1* | 6/2005 | Richardson et al. | 725/100 |

FOREIGN PATENT DOCUMENTS

| | | |
|---|---|---|
| JP | 08-016514 | 1/1996 |
| JP | 9-330064 | 12/1997 |
| JP | 2001-175602 | 6/2001 |
| JP | 2001-312472 | 11/2001 |
| JP | 2001-333403 | 11/2001 |
| JP | 2002-123238 | 4/2002 |
| JP | 2002-247052 | 8/2002 |
| JP | 2003-085112 | 3/2003 |
| JP | 2003-085131 | 3/2003 |
| JP | 2003-111042 | 4/2003 |

* cited by examiner

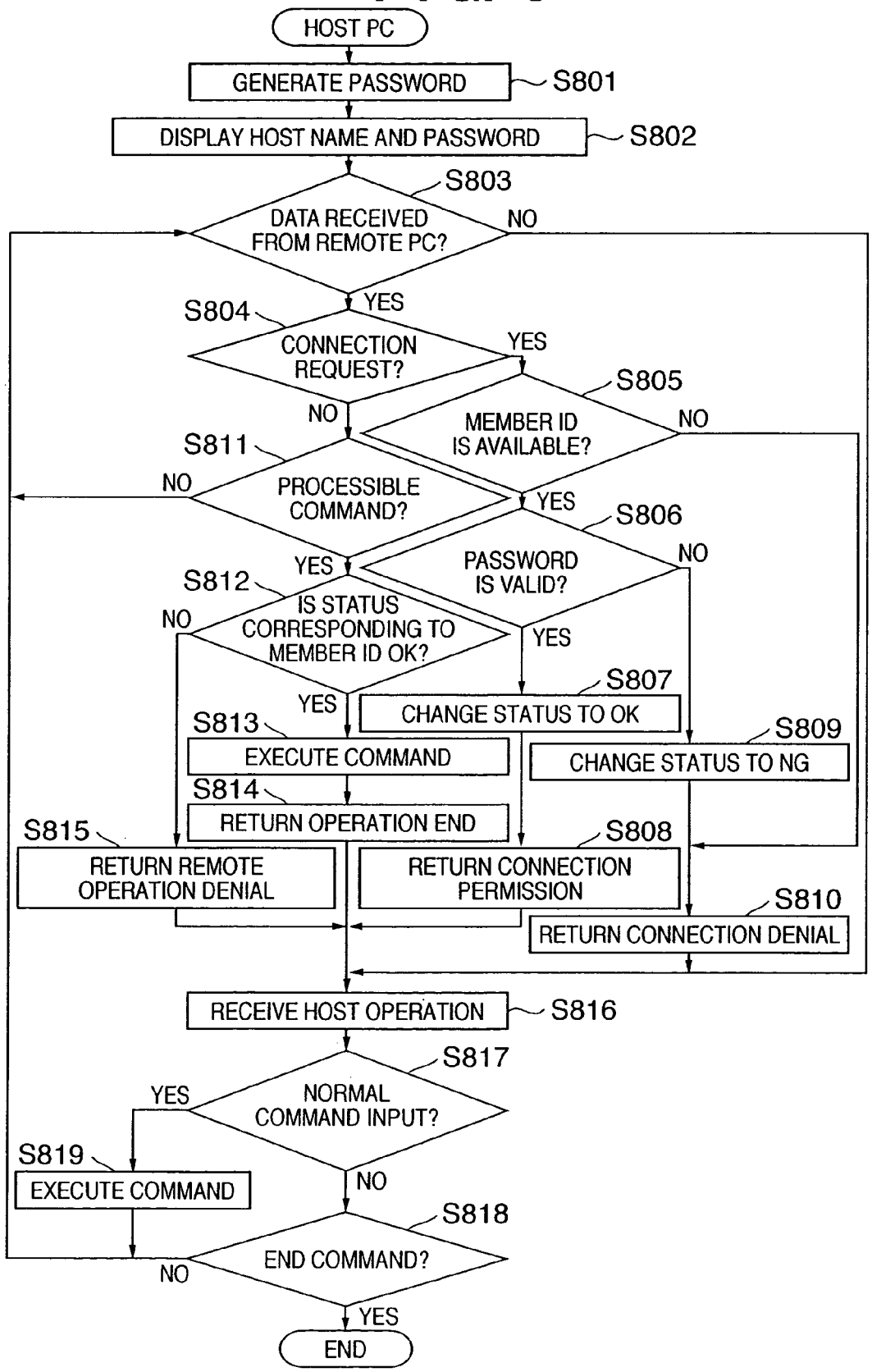

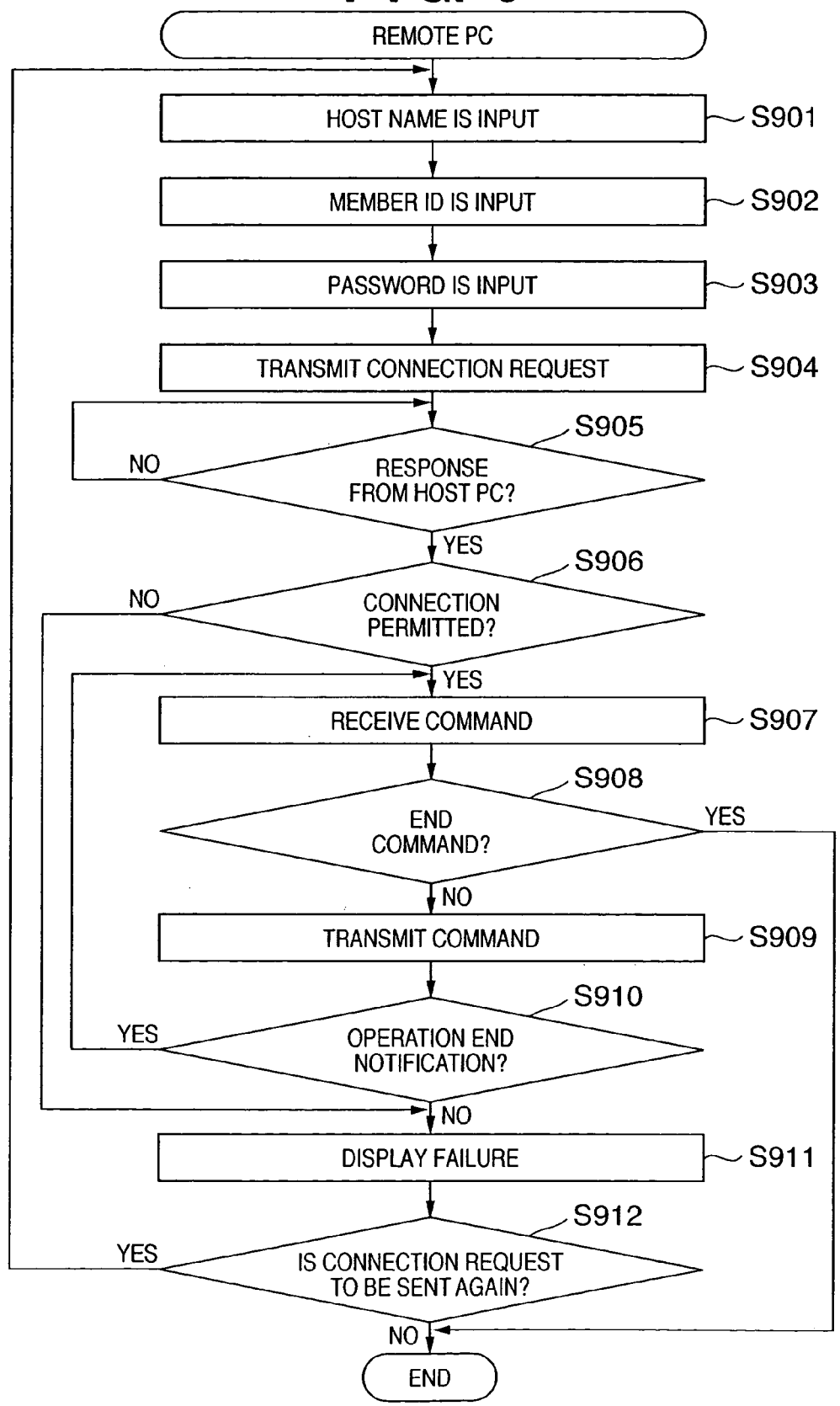

ELECTRIC CONFERENCE SYSTEM AND CONTROL METHOD THEREOF

FIELD OF THE INVENTION

The present invention relates to an electric conference system and a control method thereof and, more particularly, to an electric conference system using a large-screen display.

BACKGROUND OF THE INVENTION

An electric conference system using a large-screen display has been proposed, in which a terminal and a host computer (PC) are connected through a serial cable or the like, and presentation is done by controlling the host PC by the terminal. Only one terminal is connected, and no special procedures are necessary for connection between the terminal and the host PC.

In recent years, however, environments which allow to simultaneously connect a plurality of terminals to a host PC by wireless LAN using IEEE802.11b or Bluetooth™ are becoming popular. For this reason, even a portable terminal such as a PDA (Personal Digital Assistants) or cellular phone can easily be connected to a host PC by using radio communication.

Japanese Patent Laid-Open No. 2001-175602 proposes a technique for generating a password and connecting a device to another device after visually confirming the password. However, this technique can cope with only one-to-one connection but not with connection between a plurality of devices.

In the above-described electric conference system, presentation in an environment with a plurality of portable terminals connected is not taken into consideration.

SUMMARY OF THE INVENTION

According to an aspect of the present invention, there is disclosed a host computer for an electric conference system, which stores a member ID to specify a terminal, generates a password, displays the generated password on a display and makes the password open to participants of a conference, authenticates the terminal on the basis of a member ID and a password, which are contained in a connection request received from the terminal, and processes a command received from the terminal on the basis of the authentication result.

According to the electric conference system having such a host computer, connection from a terminal of the electric conference system is facilitated. The electric conference system can be operated from the terminal. In addition, password management by the participants of the conference can be made easy and safe.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a flowchart showing details of processing by the host PC; and

FIG. 9 is a flowchart showing details of processing by the remote PC.

DETAILED DESCRIPTION OF THE PREFERRED EMBODIMENT

An electric conference system according to an embodiment of the present invention will be described below in detail with reference to the accompanying drawings.

Figure 1:
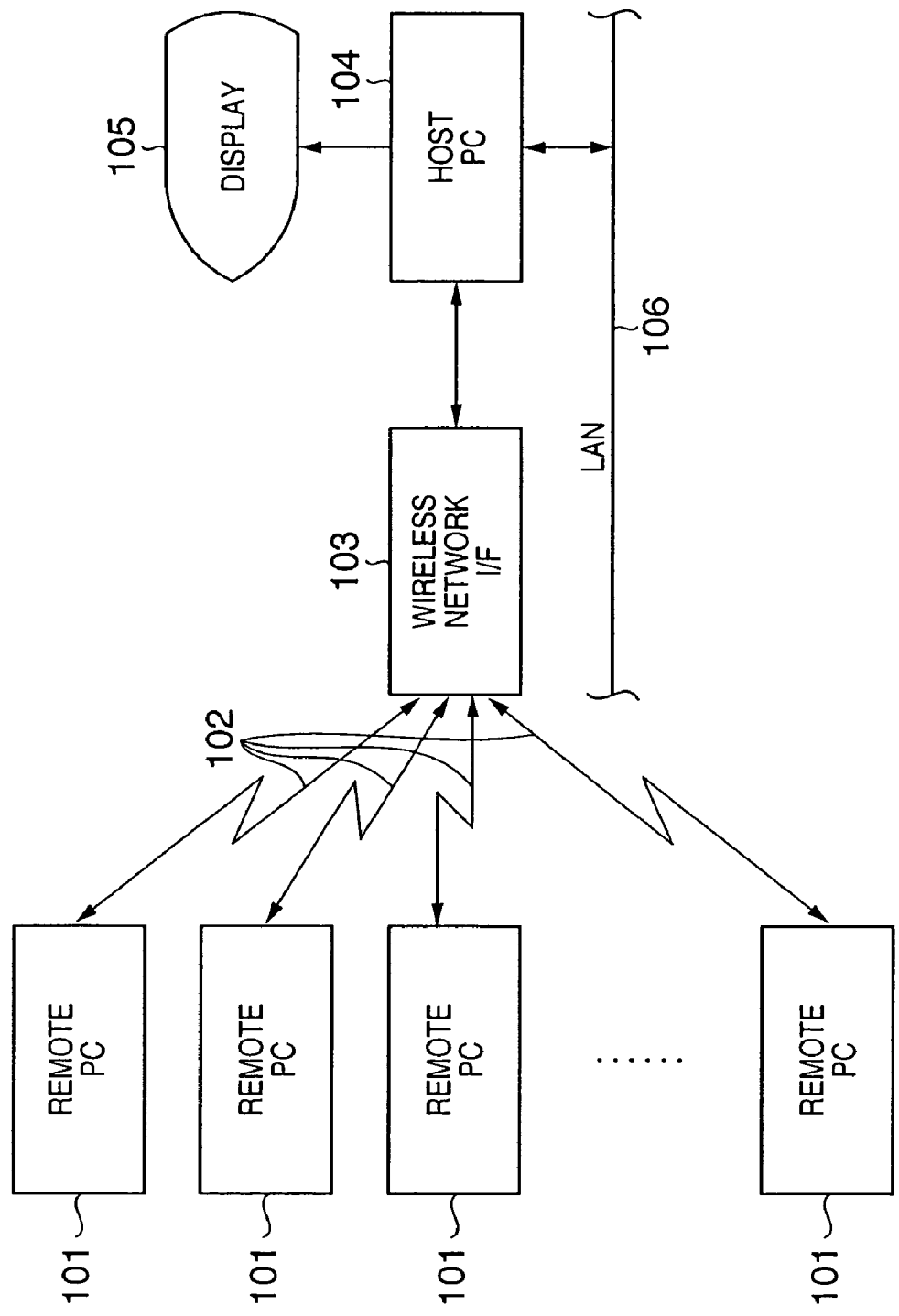
FIG. 1 is a block diagram showing the arrangement of an electric conference system.

FIG. 1 is a block diagram showing the arrangement of the electric conference system according to the embodiment.

Remote PCs 101 are portable terminals such as pocket PCs, palmtop PCs, or notebook PCs, i.e., computer devices which participants carry to a conference hall. The participants of the conference can connect the terminals to a host PC 104 and control it.

A wireless network interface (I/F) 103 is a radio communication apparatus for a wireless LAN 102 such as IEEE802.11a/b/g or Bluetooth™ and is used to connect each host PC 104 to the remote PC 101. The host PC 104 is a computer which controls the electric conference system. The host PC 104 executes a program which controls connection authentication for terminals, execution of commands for, e.g., drawing on a display 105, and the flow of the entire electric conference system.

The display 105 is a large-screen display for the electric conference system. The display 105 has a display screen which is so large that all participants of the conference can simultaneously see it. A LAN 106 is a wire network which is used for connection to the main system.

Figure 2:
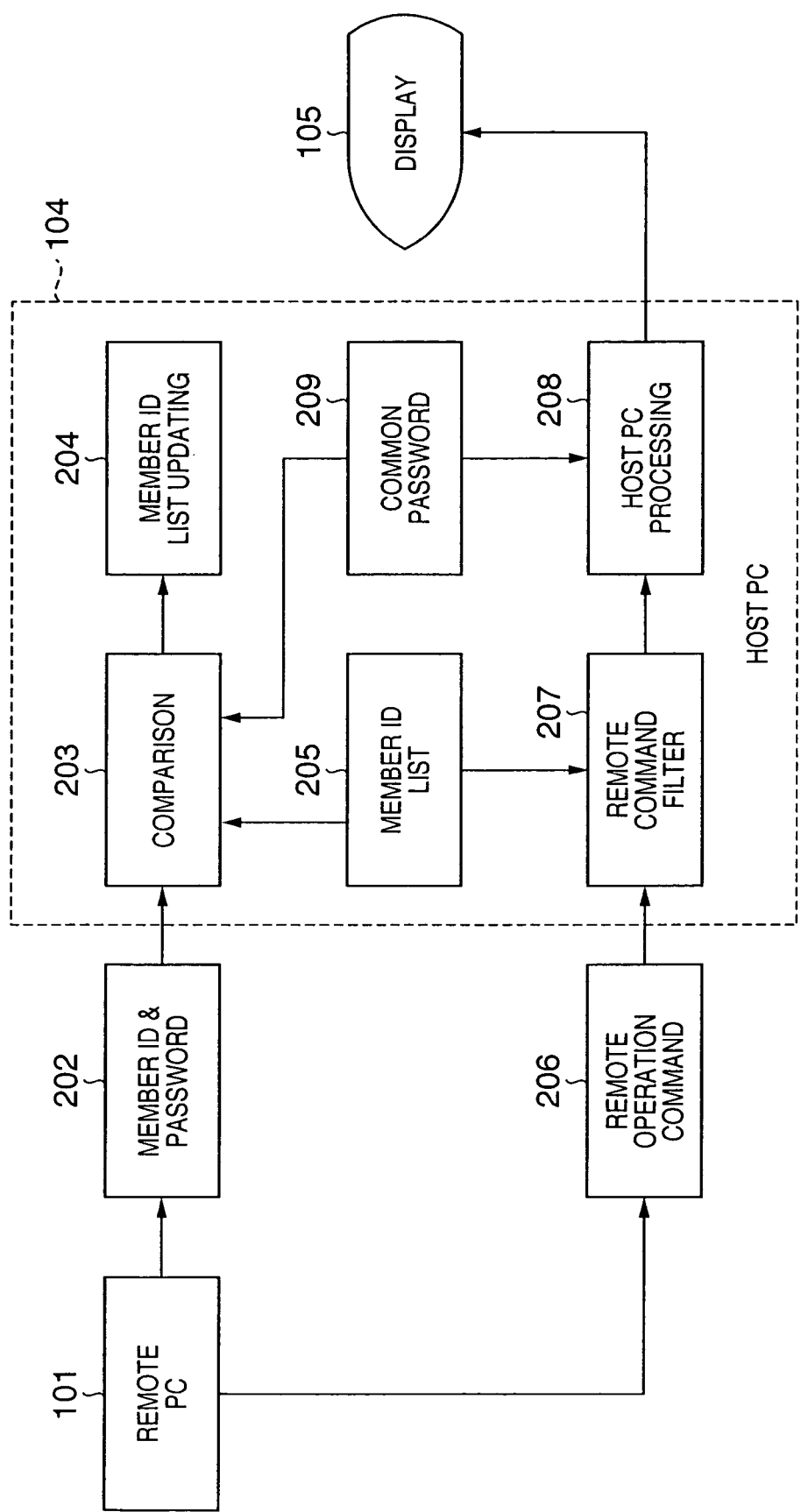
FIG. 2 is a block diagram for explaining the function of the electric conference system.

FIG. 2 is a block diagram for explaining the function of the electric conference system.

The remote PC 101 transmits a connection request or a drawing command to the host PC 104. In requesting connection, the remote PC 101 transmits a member ID & password 202.

The host PC 104 causes a comparison function 203 to compare the received member ID & password 202 with a member ID list 205 registered in a memory in advance and a generated common password 209 and determines whether connection is possible. The authentication result is recorded by a member ID list updating function 204.

The host PC 104 displays the temporarily issued common password 209 on the display 105 by a host PC processing function 208 to notify the participants of the conference of the password. The member ID list 205 stores the ID list of members who can participate in the conference. A connection enabled/disabled state can also be recorded in correspondence with each member ID.

The remote PC 101 can transmit a remote operation command 206 containing a drawing command or the like together with the member ID. Upon receiving the remote operation command 206, the host PC 104 causes a remote command filter 207 to compare the member ID attached to the command with the record in the member ID list 205 to determine whether the command is received from an already authenticated terminal. A command which is received from an already authenticated terminal is sent to the host PC processing function 208.

The host PC processing function 208 covers the whole processing by the host PC 104. In this embodiment, the host PC processing function 208 mainly executes display of the common password 209 and processing and display of a drawing command received from a terminal.

With the above arrangement, the temporary common password 209 generated by the host PC 104 is displayed on the large-screen display 105 so that all the participants of the conference are notified of the password. Each participant sends a connection request by using his/her member ID and the common password 209. Accordingly, the participant can control the host PC 104 and display on the large-screen display 105 from the remote PC 101 of his/her own. A plurality of participants can simultaneously be connected to the host PC 104, as a matter of course.

Figure 3:
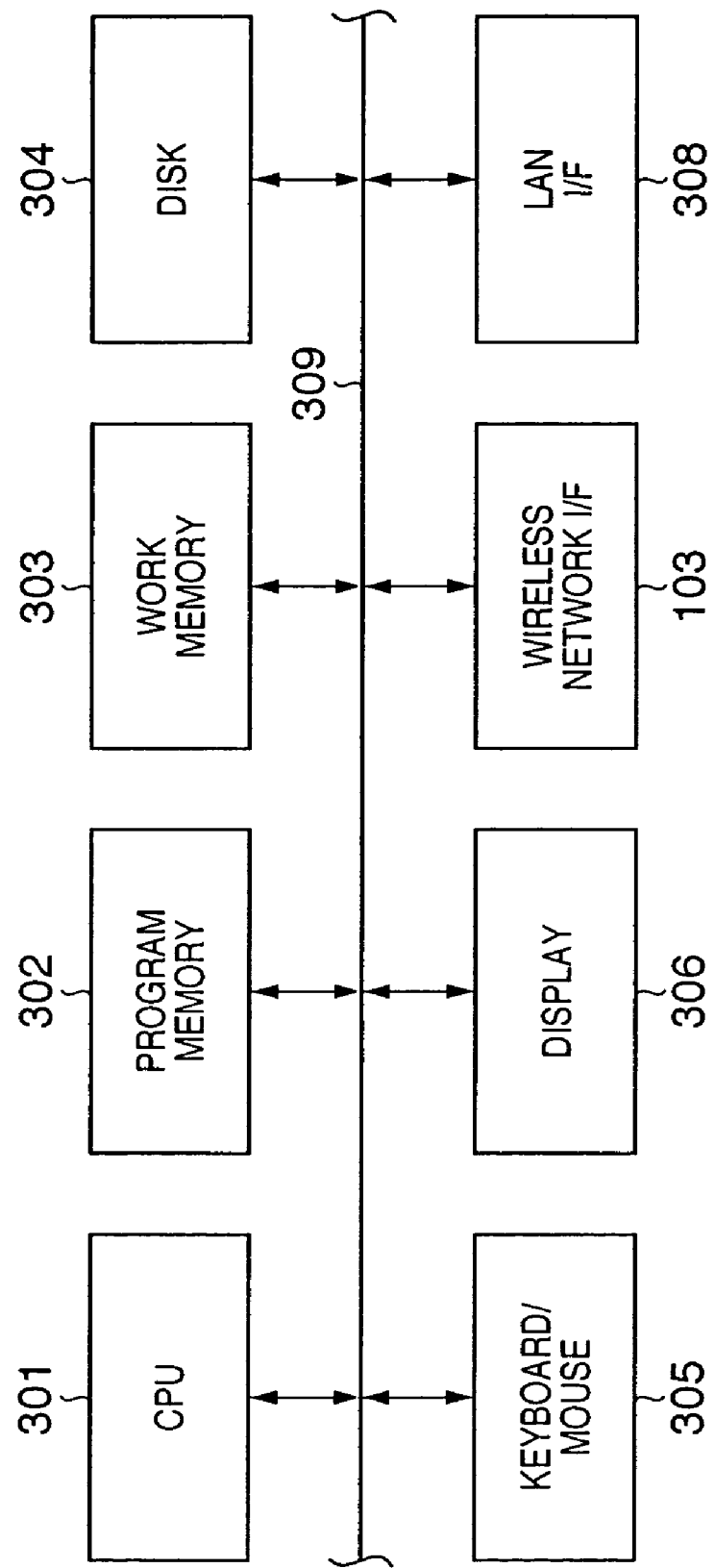
FIG. 3 is a block diagram showing the arrangement of a host PC.

FIG. 3 is a block diagram showing the arrangement of the host PC 104.

A CPU 301 controls the entire host PC 104 in accordance with programs stored in a program memory 302 and disk 304 by using a work memory 303 as a work area. The CPU 301 executes generation of the common password 209, terminal authentication processing, and the host PC processing function 208 including execution of a drawing command. The program memory 302 or disk 304 stores an operating system (OS), various kinds of application programs containing the series of processing procedures of the electric conference system, and various data of documents, photos, and sound.

A keyboard/mouse 305 includes a keyboard and a mouse to operate the host PC 104. A display 306 is used to operate the host PC 104 and can commonly be used as the large-screen display 105. A LAN I/F 308 is a cable network interface to be connected to the main system.

The above components and wireless network I/F 103 are connected to each other through a system bus 309.

Figure 4:
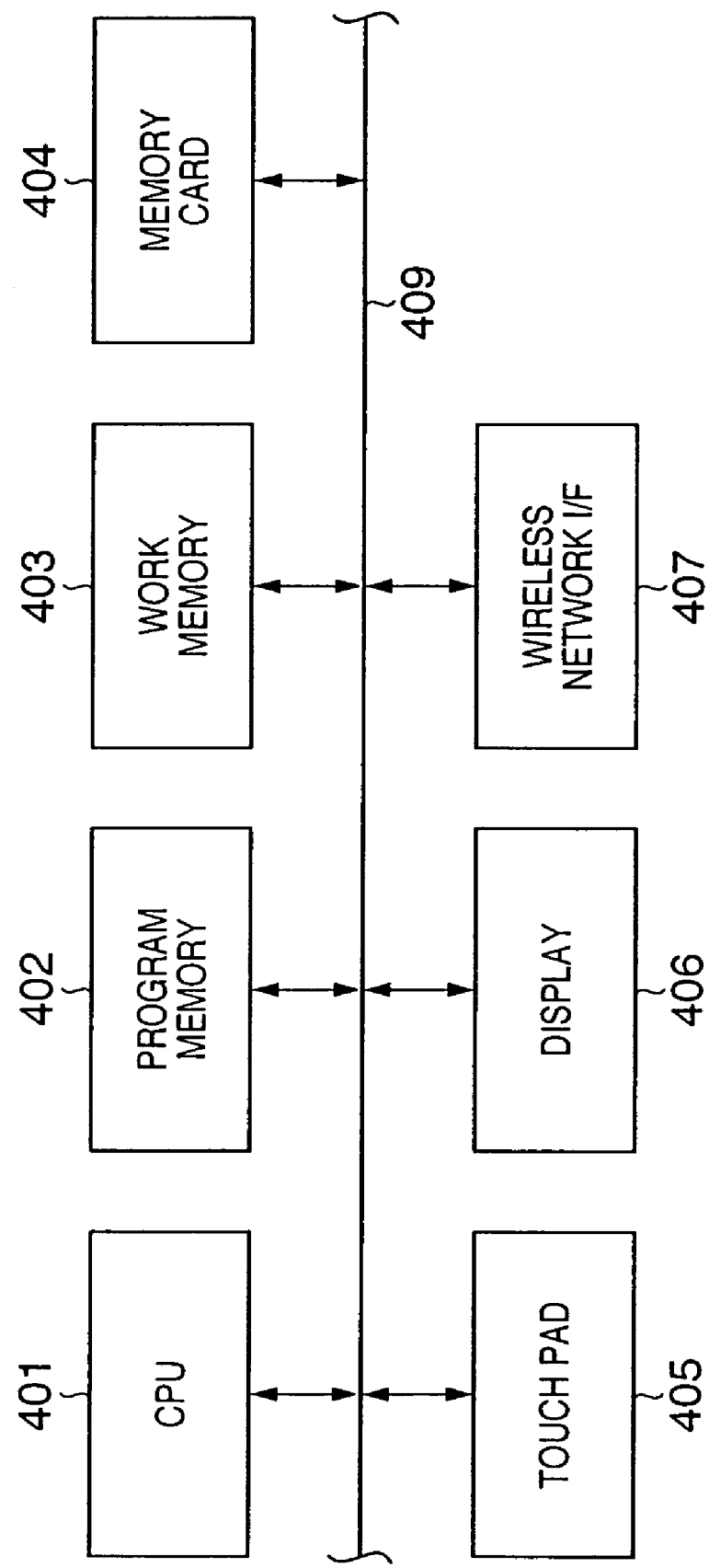
FIG. 4 is a block diagram showing the arrangement of a remote PC.

FIG. 4 is a block diagram showing the arrangement of the remote PC 101.

A CPU 401 controls the entire remote PC 101 in accordance with programs stored in storage media such as a program memory 402 and a memory card 404 by using a work memory 403 as a work area. The CPU 401 executes processing such as issue of a connection request or drawing command. The program memory 402 or memory card 404 stores an operating system (OS), various kinds of application programs containing the series of processing procedures of the terminal function, and various data of documents, photos, and sound.

A touch pad 405 is used to operate the remote PC 101 by a pen operation or the like. A display 406 is integrated with the touch pad 405 and used to operate the remote PC 101. A result of pen operation is directly displayed on the display 406. A wireless network I/F 407 is a structure to execute radio communication with the host PC 104. A wireless network card can also be used, as a matter of course.

The above components are connected to each other through a system bus 409

The connection procedures to the host PC 104 and the operation procedures of the host PC 104 by the remote PC 101 will be described next.

Figure 5:
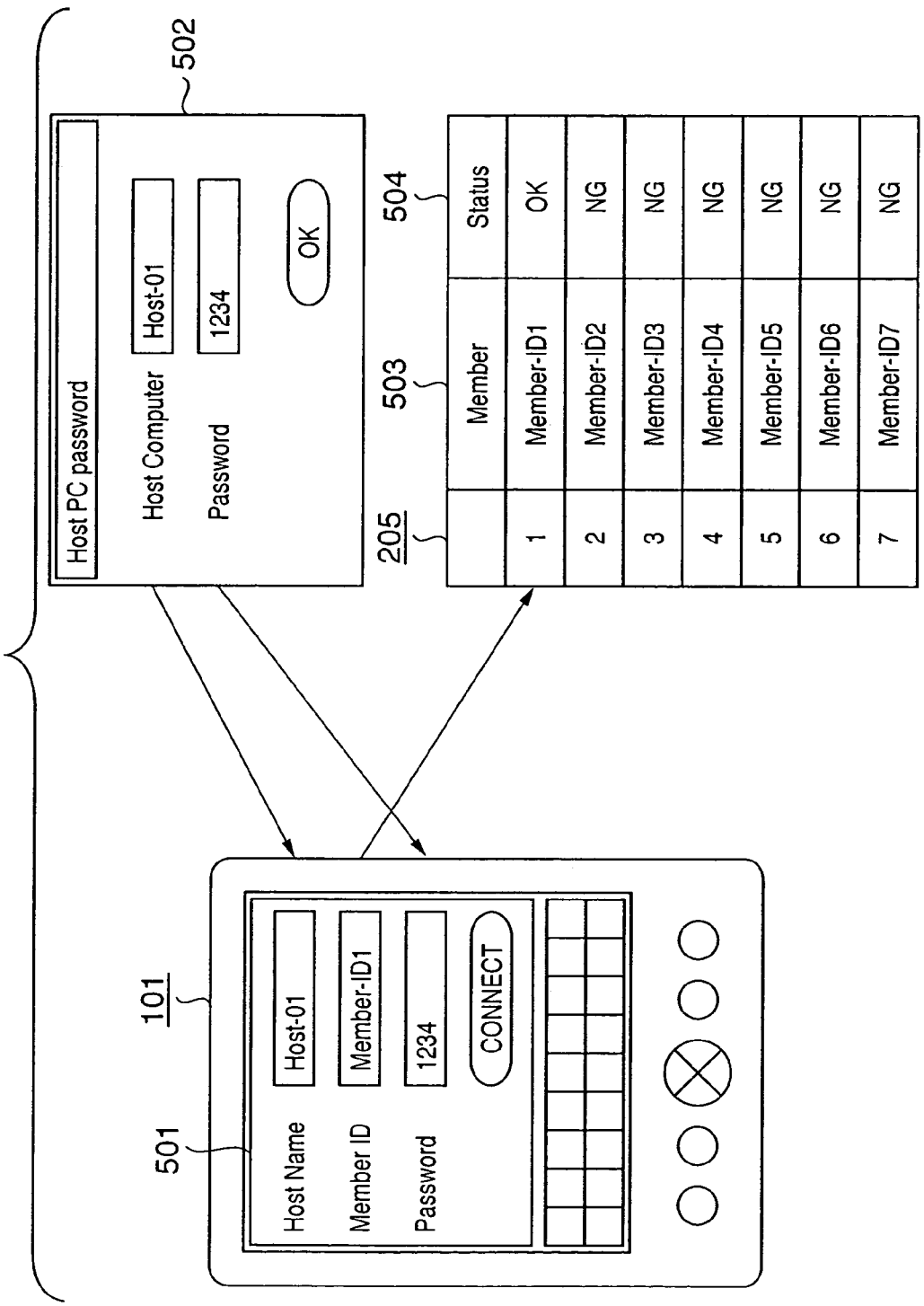
FIG. 5 is a view for explaining the connection procedures to the host PC and the operation procedures of the host PC by the remote PC.

When the host PC 104 displays the host name and password on the display 105, like a window 502 shown in FIG. 5, the user (the participant of the conference) of the remote PC 101 operates it to input the host name, member ID, and password, like a window 501, and presses the "connect" button. In this case, since the member ID "Member-ID1" is registered in a member column 503 of the member ID list 205, a status 504 corresponding to this member is updated to "OK" which represents that the member is already authenticated. "NG" in the status 504 represents an unconnected member or a member who has failed in connection.

In, e.g., a Windows environment, the host PC 104 can be specified by the host name. If the host name cannot be used as the means for specifying the host PC 104, the host PC 104 can be specified by inputting, e.g., a TCP/IP address or URL. In this embodiment, the host name is used assuming use of a Windows environment.

Figure 6:
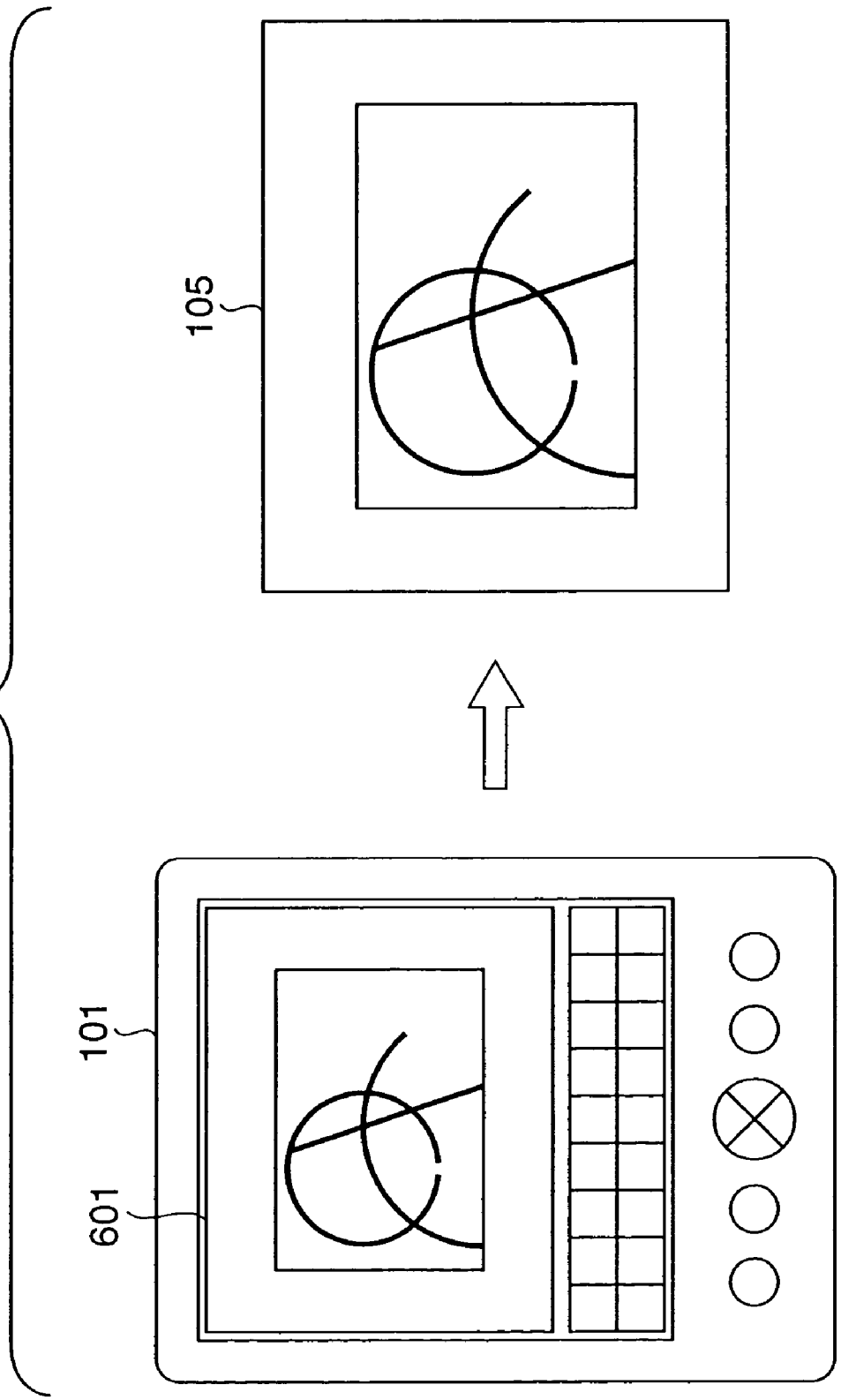
FIG. 6 is a view showing the operation of the host PC by the remote PC after connection.

FIG. 6 is a view showing the operation of the host PC 104 by the remote PC 101 after connection. In this example, the drawing operation on the remote PC 101 is directly reflected on display on the large-screen display 105 connected to the host PC 104.

Figure 7:
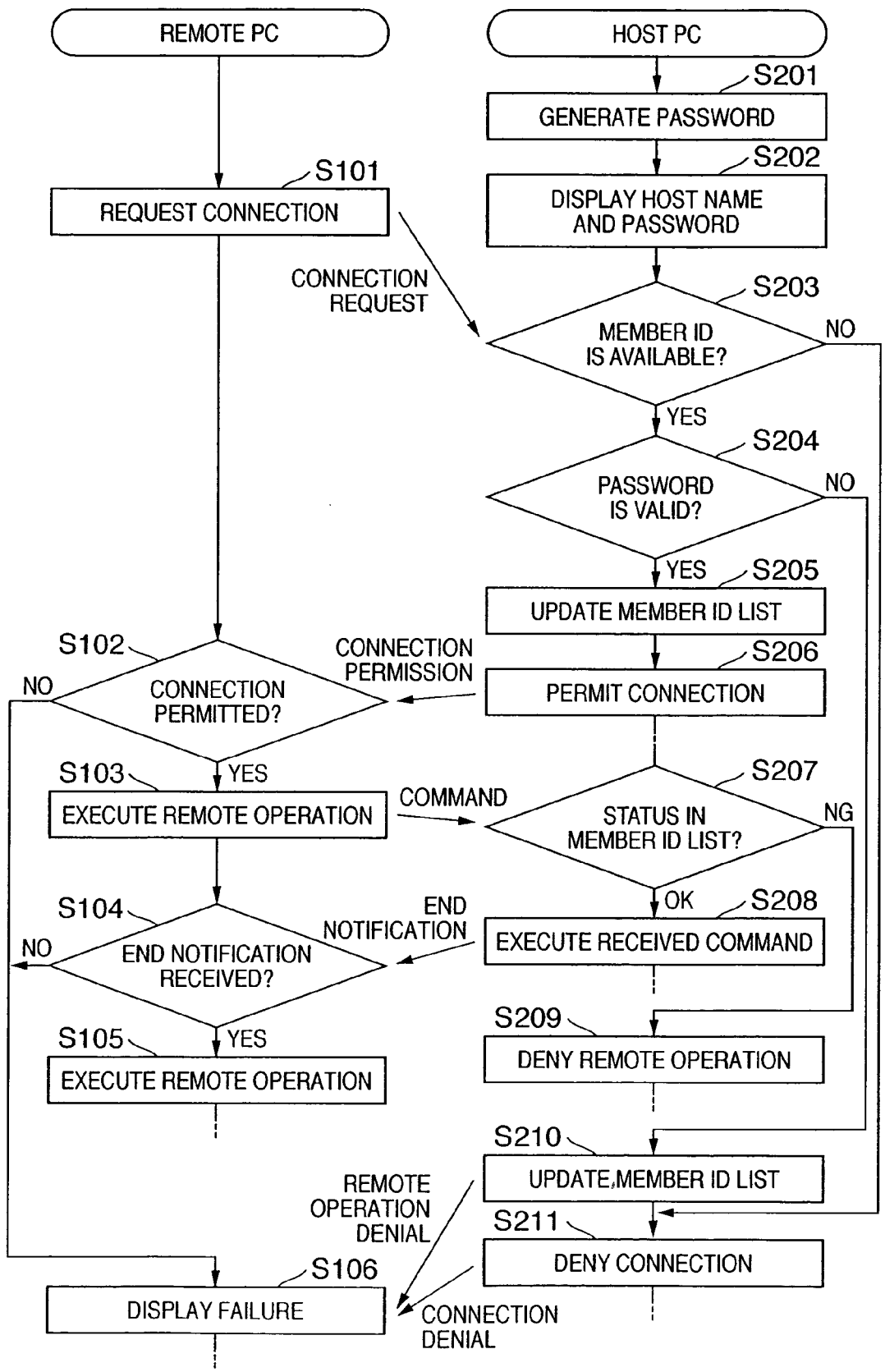
FIG. 7 is a flowchart showing the outline of processing by the remote PC and host PC.

FIG. 7 is a flowchart showing the outline of processing by the remote PC 101 and host PC 104.

When the electric conference system is activated, the host PC 104 generates the common password 209 (S201) and displays the host name and password on the display 105 (S202). When the user inputs the host name, member ID, and password, the remote PC 101 sends a connection request to the host PC 104 (S101) and determines whether connection is permitted (S102).

The host PC 104 determines whether the member ID contained in the received connection request is present in the member ID list 205 (S203) and also determines whether the password contained in the connection request coincides with the common password 209 (S204). If the member ID and password coincide, the host PC 104 updates the member ID list 205 (changes the status of the member to "OK") (S205) and gives a permission for connection to the remote PC 101 which has issued the connection request (S206).

The remote PC 101 granted connection permission remote-operates the host PC 104 and issues a command including a drawing command (S103). Upon receiving the command, the host PC 104 checks the status in the member ID list 205 corresponding to the member ID attached to the command (S207). If the status is "OK", the host PC 104 executes the received command and returns an end notification to the remote PC 101 (S208). Upon receiving the end notification, the remote PC 101 further executes the remote operation (S105).

If the member ID contained in the connection request does not coincide, the host PC 104 denies connection (S211). If the password contained in the connection request does not coincide, the host PC 104 changes the status for the member ID in the member ID list 205 to "NG" (S210) and denies connection (S211). If the status corresponding to the member ID contained in the command is "NG", the host PC 104 denies the remote operation (S209). Upon receiving the connection denial or remote operation denial, the remote PC 101 displays on the display 406 a message representing that connection or remote operation has failed (S106). The user who is notified of the failure repeats the connection request or remote operation as needed.

FIG. 8 is a flowchart showing details of processing by the host PC 104.

First, the common password 209 is generated (S801). The generated common password 209 and host name are displayed on the display 105 (S802). In automatic password generation, generally, a password having about four digits is generated by using a random number.

Next, it is determined whether data is received from the remote PC 101 (S803). If YES in step S803, it is determined whether the data is a connection request (S804). If NO in step S803, the processing advances to step S816.

If YES in step S804, it is determined whether the member ID contained in the connection request is present in the member ID list 205 (S805). If NO in step S805, "connection denial" is returned (S810). If YES in step S805, it is determined whether the password contained in the connection request coincides with the common password 209 (S806). If YES in step S806, the status of the member ID is set to "OK" (S807), and "connection permission" is returned (S808). If NO in step S806, the status of the member ID is set to "NG" (S809), and "connection denial" is returned (S810).

If data other than a connection request is received, it is determined whether the command is processible (S811). If NO in step S811, the command is discarded, and the processing returns to step S803. If YES in step S811, it is determined on the basis of the corresponding status whether the member ID represents a member who is being connected (S812). More specifically, when the corresponding status is "NG", "remote operation denial" is returned (S815). When the corresponding status is "OK", the command is executed (S813), and "operation end" is returned (S814).

Subsequently, an operation from the keyboard/mouse 305 of the host PC 104 is received (S816). It is determined whether a normal command is input (S817). If YES in step S817, the command is executed (S819), and the processing returns to step S803. If NO in step S817, it is determined whether the command is an end command (S818). If YES in step S818, the processing by the host PC 104 is ended. Otherwise, the processing returns to step S803. If the keyboard/mouse 305 is not operated for a predetermined time, the processing returns to step S803.

FIG. 9 is a flowchart showing details of processing by the remote PC 101.

First, the user inputs the host name representing the address of the host PC 104, the member ID, and the password (S901 to S903). As the member ID, an ID registered in the host PC 104 in advance must be input. If an unregistered member ID is input, connection is denied. The password is the common password 209 which is temporarily generated and displayed on the large-screen display 105.

Next, the remote PC 101 transmits a connection request to the host PC 104 (S904), waits for a response from the host PC 104 (S905), and determines whether the response is connection permission (S906). If the response is connection denial, the processing advances to step S911.

If the response from the host PC 104 is connection permission, the command is received (S907). The input command is determined (S908). If it is an end command, the processing by the remote PC 101 is ended. Otherwise, the input command is transmitted to the host PC 104 (S909). It is determined whether the response from the host PC 104 is an operation end notification (S910). If YES in step S910, the processing returns to step S907 to repeat the series of command input and transmission.

When connection denial or remote operation denial is returned from the host PC 104, a message representing it is displayed on the display 406 (S911) to notify the user that connection or remote operation has failed. It is determined whether an instruction that requests connection is input again (S912). If YES in step S912, the processing returns to step S901. Otherwise, the processing by the remote PC 101 is ended.

As described above, display on the host PC and large-screen display, which form the electric conference system, can be operated by using a portable terminal or the like. A plurality of terminals can also simultaneously be connected, as a matter of course. At this time, when the member ID registered in the host PC in advance and the common password which is made open to the public at the site of a conference are used, illicit access to the electric conference system can be prevented, and each participant need not manage the password. Hence, even when a participant forgets the password, he/she can access the electric conference system. In addition, the leakage of password can also be prevented.

Even a computer which is connected to the host PC of the electric conference system through the LAN cannot know the password without participating in the conference. Hence, unnecessary connection of a non-participant through a network such as a LAN can be prevented.

In place of the member ID, the MAC (Media Access Control) address of the wireless network I/F 407 of the remote PC 101 may be used. In this case, the MAC address of each remote PC 101 used by a participant of the conference is registered in the member ID list 205 of the host PC 104 in advance. When the MAC address is used, each user (participant) of the remote PC 101 need not manage the member ID.

When a participant name field is added to the member ID list 205, and a participant name corresponding to a member ID is registered, information (name) representing the participant who is operating display on the large-screen display 105 can also be displayed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for controlling an electric conference system and communicating with a plurality of terminals, the apparatus comprising:
   a memory which stores an ID of a member who is permitted to participate in the conference;
   a generator, constructed to generate a temporary password common to, and associated with, the plurality of terminals;
   a display constructed to display the generated temporary password to make the temporary password open to participants of a conference, wherein the display is different from displays of the plurality of terminals;
   an authentication section, constructed for availability for use to authenticate any number of the plurality of terminals based at least on the temporary password common to the plurality of terminals and the ID, which are contained in a connection request received from the terminal; and
   a processor, constructed to process a command received from the terminal based on an authentication result from the authentication section,
   wherein the authentication section stores a status corresponding to the ID in the memory, and the processor determines based on the status whether the received command is processible.

2. The apparatus according to claim 1, further comprising a communication section constructed to execute radio communication with a portable terminal.

3. The apparatus according to claim 1, wherein the processor updates display on the display in accordance with a drawing command contained in the received command.

4. The apparatus according to claim 1, wherein the display is a large-screen display for conference.

5. A method of controlling an electric conference system using an apparatus which communicates with a plurality of terminals, the method comprising the steps of:
   storing an ID of a member who is permitted to participate in the conference in a memory of the apparatus;
   generating a temporary password common to, and associated with, the plurality of terminals;
   displaying the generated temporary password on a display of the apparatus making the temporary password open to participants of a conference, wherein the display of the apparatus is different from displays of the plurality of terminals;
   authenticating any number of the plurality of terminals based at least on the temporary password common to the plurality of terminals and the ID, which are contained in a connection request received from the terminal; and
   processing a command received from the terminal based on an authentication result of the authenticating step,
   wherein a status corresponding to the ID is stored in the memory in the authenticating step, and it is determined based on the status whether the received command is processible in the processing step.

6. A computer-executable program stored in a non-transitory computer-readable storage medium comprising program code causing a computer to perform a method of controlling an electric conference system using an apparatus which communicates with a plurality of terminals, the method comprising the steps of:
   storing an ID of a member who is permitted to participate in the conference in a memory of the apparatus;
   generating a temporary password common to, and associated with, the plurality of terminals;
   displaying the generated temporary password on a display of the apparatus making the temporary password open to participants of a conference, wherein the display of the apparatus is different from displays of the plurality of terminals;
   authenticating any number of the plurality of terminals based at least on the temporary password common to the plurality of terminals and the ID, which are contained in a connection request received from the terminal; and
   processing a command received from the terminal based on an authentication result of the authenticating step,
   wherein a status corresponding to the ID is stored in the memory in the authenticating step, and it is determined based on the status whether the received command is processible in the processing step.

7. A non-transitory computer-readable storage medium storing a computer-executable program causing a computer to perform a method of controlling an electric conference system using an apparatus which communicates with a plurality of terminals, the method comprising the steps of:
   storing an ID of a member who is permitted to participate in the conference in a memory of the apparatus;
   generating a temporary password common to, and associated with, the plurality of terminals;
   displaying the generated temporary password on a display of the apparatus making the temporary password open to participants of a conference, wherein the display of the apparatus is different from displays of the plurality of terminals;
   authenticating any number of the plurality of terminals based at least on the temporary password common to the plurality of terminals and the ID, which are contained in a connection request received from the terminal; and
   processing a command received from the terminal based on an authentication result of the authenticating step,
   wherein a status corresponding to the ID is stored in the memory in the authenticating step, and it is determined based on the status whether the received command is processible in the processing step.

* * * * *